Oct. 27, 1942. E. E. WEMP 2,300,187
FRICTION CLUTCH
Filed July 1, 1939 3 Sheets-Sheet 1

INVENTOR.
Ernest E. Wemp
BY Barnes, Kisselle, Laughlin & Raisch
ATTORNEYS

Oct. 27, 1942. E. E. WEMP 2,300,187
FRICTION CLUTCH
Filed July 1, 1939 3 Sheets-Sheet 2

INVENTOR.
Ernest E. Wemp
BY
Barnes, Kisselle, Laughlin &
ATTORNEYS

Oct. 27, 1942.   E. E. WEMP   2,300,187
FRICTION CLUTCH
Filed July 1, 1939   3 Sheets-Sheet 3
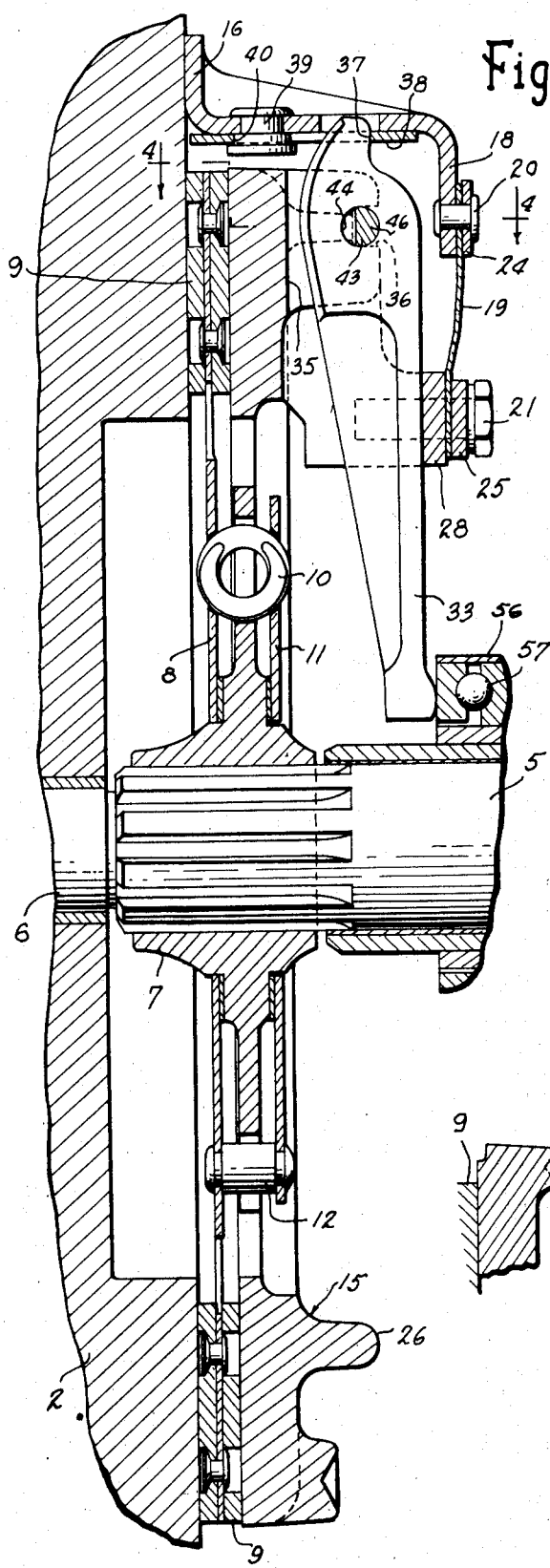
Fig. 3.
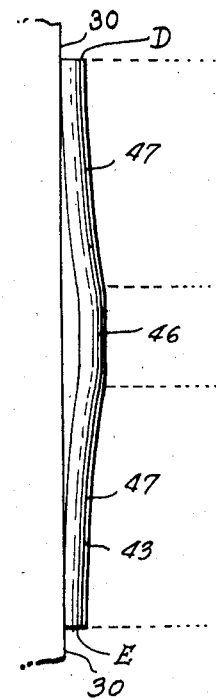
Fig. 7.
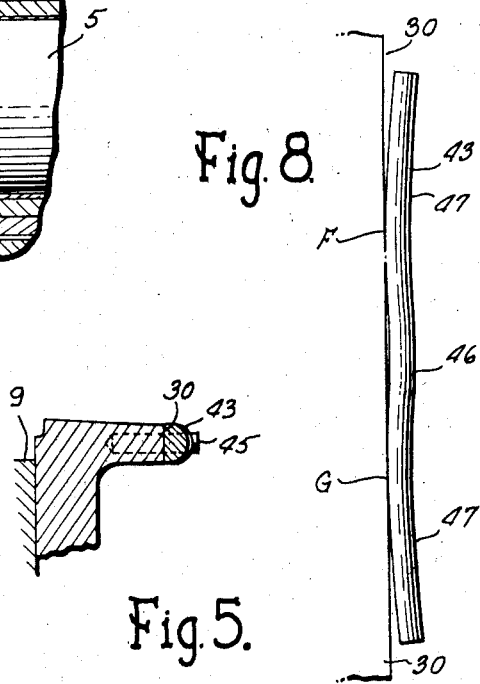
Fig. 8.
Fig. 5.
INVENTOR.
Ernest E. Wemp
BY
Barnes, Kisselle, Laughlin & Raisch
ATTORNEYS Patented Oct. 27, 1942

2,300,187

UNITED STATES PATENT OFFICE 2,300,187

FRICTION CLUTCH

Ernest E. Wemp, Detroit, Mich.

Application July 1, 1939, Serial No. 282,345

9 Claims. (Cl. 192—68)

This invention relates to a friction clutch and it has to do particularly with new and improved clutch structure for facilitating clutch engagement.

The invention is directed to the provision of a clutch suitable for use in automotive vehicles, although the invention is not limited to such use, as the principles of the invention may be embodied in clutches for any use. A clutch which has good engaging characteristics should be arranged so that there is a cushioning action which takes place during the engaging stage so that the engagement takes place over a range of movement of a control member such as the usual clutch control pedal; that is to say, the clutch control pedal should have some considerable range of movement between the point of initial frictional engagement and the point of final engagement. The general practice heretofore has been to provide a driven member of a yieldably compressible nature, as for example, by the incorporation of cushion spring elements between the facings, so that upon being packed between driving members, the driven member collapsed or partially collapsed against the action of the cushion springs. This arrangement gives to the clutch releasing lever a range of movement during the engaging action which substantially corresponds to the collapsing action of the driven member, usually multiplied, however, by the leverage advantage.

One of the principal objects of this invention is to provide a clutch structure wherein the means for providing the cushion action for clutch engagement is incorporated in a driving member or members of the clutch. This arrangement permits the use of a driven disc of a simple structure where the facings may be attached directly to a disc member or the like without the use of cushion elements, and permits the use of other simplified forms of driven members such, for example, as the one shown in my application Serial No. 285,639, filed July 21, 1939.

A clutch constructed in accordance with this invention has an engaging action which takes place through a range of movement of a control element such as the usual clutch pedal. For example, the clutch may employ devices such as clutch levers, which shift, during the clutch engaging action, through a range of movement, with the engagement pressure starting substantially from zero and gradually increasing through the range of movement of the levers to final engagement pressure. The control element may move in a manner corresponding to the movement of the levers and thus in turn has a range of movement through which the pressure is gradually increased, starting substantially from zero pressure. A further object of the invention is to provide a clutch of this nature having a desirable engaging pressure curve which is relatively flat in the early stages of the engagement and which increases and becomes relatively steep in the later stages of clutch engagement.

A clutch structure for carrying out the invention is disclosed in the accompanying drawings wherein a clutch suitable for use with an automotive vehicle is illustrated. In these drawings:

Fig. 3 is an enlarged cross sectional view taken substantially on line 3—3 of Fig. 2.

Fig. 5 is a detailed sectional view taken substantially on line 5—5 of Fig. 4.

Fig. 6 is a detail plan view of an element used in the clutch lever system.

Fig. 7 is a view of a cushion member.

Fig. 8 is a view diagrammatically illustrating the cushion member in flexed or substantially collapsed position.

Fig. 9 is a view illustrating a clutch engaging curve.

Figure 1:
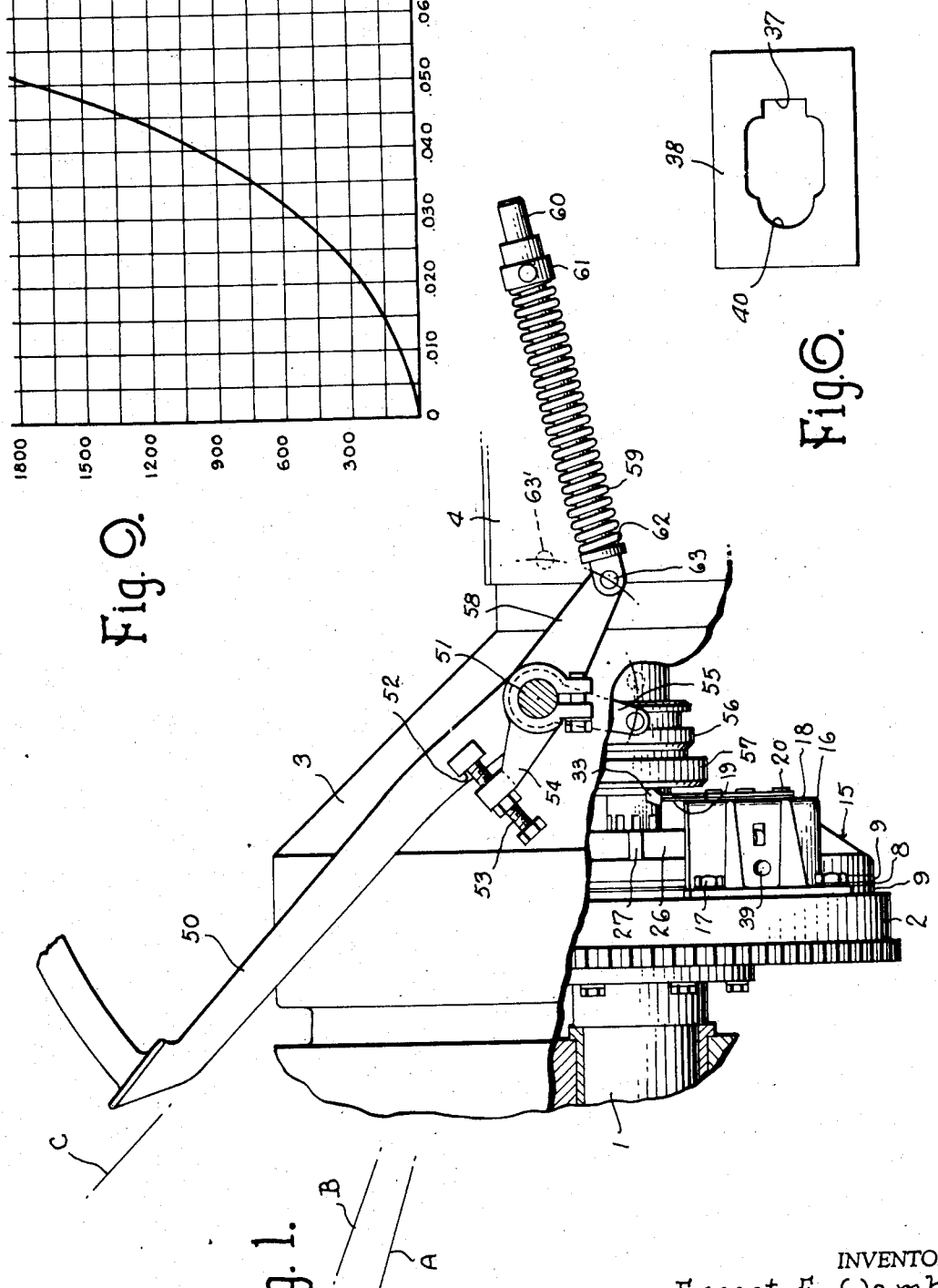
Fig. 1 is a general view of a clutch and its control lever and packing spring, in assembly with an engine, bell housing and transmission, such as are usually found in automotive vehicle engines.

In Fig. 1 the crank-shaft of an engine is shown at 1 on the end of which is a flywheel 2 disposed in the usual bell housing 3, to the rear of which is a transmission case 4 for the usual transmission gears. The flywheel 2 constitutes one driving member of the clutch, while a driven shaft 5 is piloted in the flywheel as at 6 and extends into the transmission case 4. A driven member is secured to the driven shaft and, as shown in Fig. 3, the driven member has a hub 7 splined to the driven shaft and a disc member 8 which has friction facings 9 secured to its outer zone. As illustrated, the friction facings are riveted directly to the disc 8 so that the driven member is substantially non-compressible. The disc 8 and the hub are joined with a torque-transmitting connection which may be of the vibration dampening type and which provides a yieldable connection. This arrangement, as shown, generally resides in coil springs 10 mounted in aligned apertures or windows in the disc 8, the flange of the hub and a washer 11 secured to rotate in unison with the disc 8 by studs 12. However, this vibration dampening arrangement is independent of the invention.

A pressure plate 15 is disposed on the side of the driven member opposite the flywheel and it is carried to be rotated by the flywheel. To this end, a plurality of brackets 16 are secured to the flywheel by cap screws 17, and each extends axially away from the flywheel and has an inwardly extending piece 18. Flexible sheet metal plates, which may be sheet steel, 19 are secured to the brackets as by means of rivets 20, and they extend inwardly and are secured to the pressure plate 15 by cap screws 21. The plates 19 thus serve to drive the pressure plate and are flexible for axial movement of the pressure plate. Mild steel elements 24 and 25 are placed under the rivet heads and cap screw heads to protect the steel spring elements. As shown in Fig. 3, the flexible plates 19 have a slight wave or bend formation to accommodate the differential in the distances between the rivets 20 and cap screws 21 when the pressure plate shifts axially. In fact, as shown herein, the flexible plates 19 are flexed in the position shown in Fig. 3, which is an engaged position, with the pressure plate packed against the driven disc. Upon release of the packing pressure, as will later appear, the segments 19 serve to retract the pressure plate from the driven disc.

Figure 2:
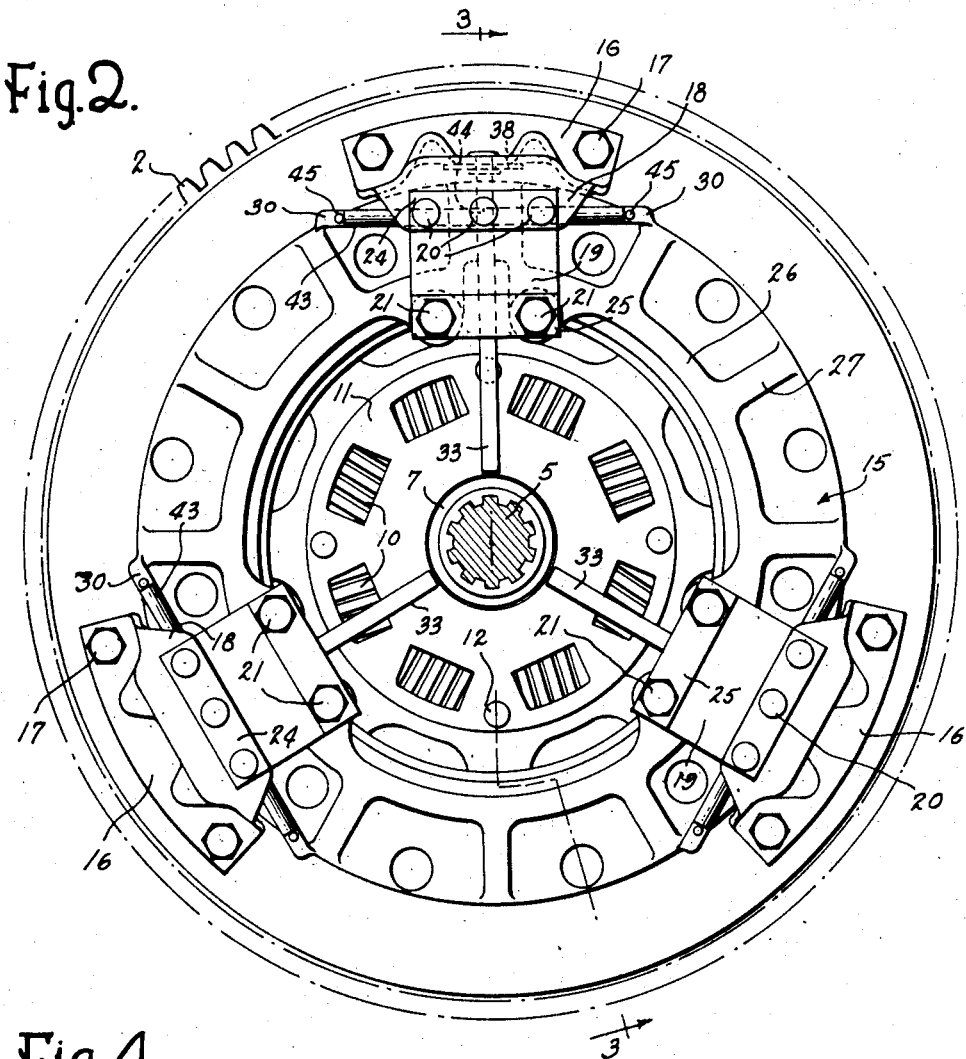
Fig. 2 is a rear elevational view of the clutch.

As shown in Fig. 2, the pressure plate has a reenforcing rib of an annular nature 26 with fillets 27, and it also has lugs 28 for accommodating the cap screws for the attachment of the flexible plates. The plate also has flats or lands 30. The plate is milled out or divided as at 35 for the reception of levers 33, and in this connection the elements 25 may serve as reenforcing struts for this section of the pressure plate. The pressure plate has grooves 36 intersecting the milled out portions 35, which grooves may be formed by a milling operation and which are in alignment with the surfaces 30.

As shown in Fig. 3, each lever fulcrums as at 37 on a fulcrum plate 38 attached to a bracket by means of a headed rivet 39 so that the fulcrum plate can swing around the rivet and so that the fulcrum plate has some looseness for radial shift to eliminate binding action. The fulcrum plate is shown in Fig. 6, the fulcrum proper being a straight surface as indicated, and the plate having a curved surface 40 which engages the headed rivet.

Figure 4:
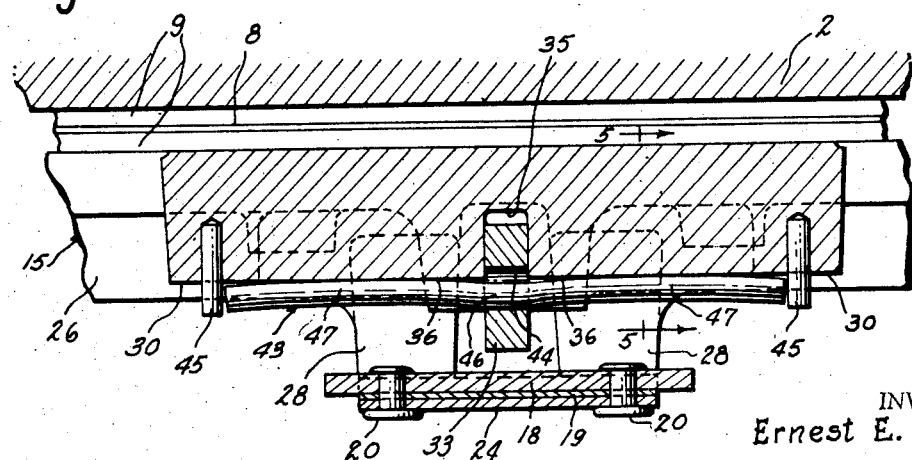
Fig. 4 is a further enlarged cross sectional view taken substantially on line 4—4 of Fig. 3.

Each lever has a pivotal connection with the pressure plate, this being the load point of each lever and the cushioning arrangement is embodied in this structure. The pivotal member takes the form of a spring metal simple beam member 43 which, as shown in Fig. 3, is advantageously of D-shape in cross section. The chord of the D, or the flat side, is beyond the center so that the pivotal member is nicely retained in the pivotal aperture 44 in the lever. The ends of the pivot member abut against the surfaces 30, as shown in Figs. 2 and 4, and may be retained against displacement by pins 45.

These members are preferably formed so as to have an initial shape substantially as shown in Fig. 7. The member is preformed so that it has a central portion 46 normally elevated from the lands 30, with opposite portions 47. The portion 46 lies in the aperture in the lever. Each portion 47 is fashioned so that it is substantially an arc of a circle with the under or flat side presenting a convexity; for example, with a pivot member of about four inches in length, with about .070 of an inch elevation to the central portion 46, the portions 47 may be struck on a radius of about 23½ inches. When the member bears against the surface 30, such surfaces are tangent to the curvature. The function of this structure will be referred to later.

The forces for engaging the clutch are, in the clutch shown, transmitted through the cushion pivot members, and in this connection the engaging pressure may be provided by an arrangement as shown in my application Serial No. 198,388, filed March 28, 1938, now Patent No. 2,275,388, March 3, 1942. This is illustrated in Fig. 1 where the usual clutch pedal is shown at 50 pivoted around a rock-shaft 51 and having an abutment 52 for engaging an adjustable member 53 on an arm 54 non-rotatably associated with the rock-shaft. The rock-shaft has an arm 55 engaging the clutch releasing member 56 which may be equipped with an antifriction thrust bearing 57 for engaging the inner ends of the levers or lever tips. The clutch pedal has an arm 58 acted upon by a spring 59 and which surrounds a rod 60 slidably mounted in a pivoted abutment 61, the spring reacting against the abutment 61 and acting upon an abutment 62. The parts are shown in clutch engaged position in Fig. 1 with the spring 59 applying its force through the connections mentioned, which causes a shift of the throw-out bearing 57 to the left, thus causing the levers to fulcrum at 37 to in turn advance the pressure plate to the left through the cushion members 43.

In the assembly of the clutch, the fulcrum members 38 are preferably stretched beyond their elastic limit in order to bring the lever tips into a common plane for engagement with the throw-out bearing. The driving plates 19 preferably are so initially formed as to hold the pressure plate retracted from the driven disc. These forces, however, are small and the plates 19 are easily flexed to permit of clutch engagement by the compression spring 59.

The clutch is shown in engaged position in Figs. 1, 3 and 4. To release the clutch the pedal 50 is depressed to take the load off the lever tips and retract the throw-out bearing to permit the pressure plate to retract from the driven member by the action of the driving segments 19. When the lever is completely depressed for complete clutch disengagement, the lever may be in a position indicated by the line "A" in Fig. 1, at which time the pivotal connection 63 between the rod 60 and the lever has been shifted to the position indicated at 63' to thus reduce the turning moment exerted on the pedal. At this time there is substantially no load on the pivot members 43, and they assume their original position substantially as shown in Fig. 7. As the clutch is engaged the lever 50 is permitted to retract, and the clutch starts to engage as soon as there is an initial packing pressure exerted upon the driven disc. This, for example, may be at the position B shown in Fig. 1.

At this moment there is an infinitely small packing pressure, and there is an immediate cushioning action because, however small the packing pressure, there is a cushioning action afforded by the members 43. As the clutch engagement continues, say from the location B to full engagement location C, the packing pressure increases and the cushioning action takes place because of the yielding of the pivot members 43.

It has been found that the members 43 which embody the described construction will follow the law of beams. The resistance to deflection in the pivot members thus constructed varies inversely as the cube of the distance between the points of support. As the beams are flattened out incident to clutch packing pressure, the convex surfaces have sort of a rolling action upon the lands 30 so that as the beams are collapsed the points of support progressively move inwardly. The maximum distance between the points of support is between the ends D and E shown in Fig. 7, whereas the points of support, as shown in Fig. 8, may be substantially at the points F and G when the beams are collapsed a considerable extent. In the movement of the intermediate part 46 from the Fig. 7 position to the Fig. 8 position, the points of support shift inwardly from D and E to about points as indicated at F and G. Thus the beams offer increased resistance to deflection, and this arrangement makes it feasible to obtain a satisfactory clutch engaging curve as illustrated in Fig. 9. As will be noted, this curve starts at zero pressure and is quite flat in the initial stages of engagement, but gradually increases in steepness. The abscissas of the chart illustrated in Fig. 9 represent the deflection in inches, while the ordinates represent the packing pressure in pounds. The curve shown is exemplary only. Different clutch installations may require some variations in this curve. For one thing, the cushion members may be varied as to strength by changing their length or cross sectional dimensions, or the characteristics of the metal, and there may even be some variation in the formation of the curved parts 47 and in the length of the radius upon which the curved parts are formed.

With this arrangement it will be noted that the cushioning action starts from zero pressure and increases through a range of lever tip movement, and through a range of movement of the pedal. For instance, if initial engagement takes place at position B, the cushioning resistance increases throughout lever movement from position B to position C. There is no abrupt increase in packing pressure with zero or an infinitesimal movement of the lever tips, since any packing pressure increase is accompanied by its corresponding cushion action. When the clutch is released, there is substantially a zero load on the lever tips.

Thus, even though the driven member is of a solid substantially non-compressible nature, the packing pressure applied thereto is cushioned, and the pressure may be gradually applied throughout a range of movement of the lever tips and the clutch actuating pedal or lever, with the cushioning action becoming effective immediately upon initial application of packing pressure.

In some of the claims appended hereto certain descriptive language is used which has been selected as expedient. For instance, the cushion member is described as being of arched formation. This is intended to describe the structure of the beam wherein the center portion is elevated relative to the portions to opposite sides thereof, regardless of the particular formation or shape of the arch. In fact, the shape need not be one which technically falls within the terms of an arch. The term has been selected, however, to briefly describe a structure wherein the beam is not straight. Also, it is specified that certain portions on opposite sides of the center part of the beam are on a curve or arc which is reverse relative to the arch. This is intended to mean, by reference to Fig. 7, that the concavity of the arch is on one side of the beam, while the concavity of the curved portions is on the other side of the beam. Also, it is specified that the center of the circle upon which the curved portion is formed is on the convex side of the beam; it will be apparent from a consideration of Fig. 7 that this means that the center of the circle is to the right of Fig. 7.

I claim:

1. In a clutch, driving and driven members arranged for frictional engagement under pressure, one of the driving members being in the form of a shiftable pressure plate, clutch levers each having a pivotal engagement with the pressure plate and another driving member, means for applying clutch packing pressure to the levers for shifting the pressure plate to cause engagement, one of the pivotal connections for each lever comprising a spring metal simple beam subject to deflection and a shortening of the distance between its supports incident to the application of the engaging pressure.

2. In a clutch, driving and driven members arranged for frictional engagement under pressure, one of the driving members being in the form of a shiftable pressure plate, clutch levers each having a pivotal engagement with the pressure plate and another driving member, means for applying clutch packing pressure to the levers for shifting the pressure plate to cause engagement, one of the pivotal connections for each lever comprising a spring metal beam subject to deflection incident to the application of the engaging pressure, each beam being substantially of arch formation whereby the center portion is elevated from the ends and the parts between the center portion and the ends having a curved formation reverse to the arch formation of the beam.

3. In a clutch, driving and driven members arranged for frictional engagement under pressure, one of the driving members being in the form of a shiftable pressure plate, clutch levers each having a pivotal engagement with the pressure plate and another driving member, means for applying clutch packing pressure to the levers for shifting the pressure plate to cause engagement, the pivotal connection between each lever and the pressure plate comprising a spring metal beam subject to deflection incident to the application of the engaging pressure.

4. In a clutch, driving and driven members arranged for frictional engagement under pressure, one of the driving members being in the form of a shiftable pressure plate, clutch levers each having a pivotal engagement with the pressure plate and another driving member, means for applying clutch packing pressure to the levers for shifting the pressure plate to cause engagement, the pivotal connection between each lever and the pressure plate comprising a spring metal beam subject to deflection incident to the application of the engaging pressure, each beam being substantially of arch formation whereby the center portion is elevated from the ends and the parts between the center portion and the ends having a curved formation reverse to the arch formation of the beam.

5. In a clutch, a driving member, a driven member, an axially shiftable pressure plate, a plurality of levers, means providing a fulcrum for each lever on the driving member, said pressure plate having spaced flats thereon on opposite sides of each lever, an arched beam for each lever, each having its ends engaging the flats and each having a central portion upon which a lever pivots, and means for applying clutch packing pressure through the levers and which subjects the beams to deflection for cushioning clutch engagement.

6. In a clutch, a driving member, a driven member, an axially shiftable pressure plate, a plurality of levers, means providing a fulcrum for each lever on the driving member, said pressure plate having spaced flats thereon on opposite sides of each lever, an arched beam for each lever, each having its ends engaging the flats and each having a central portion upon which a lever pivots, and means for applying clutch packing pressure through the levers and which subjects the beams to deflection for cushioning clutch engagement, each beam having its central portion raised relative to its ends whereby the beams are of arched formation, and the parts of each beam between the central portion and each end being in the form of an arc of a circle having its center relatively remote from the beam and on the convex side of the arch formation of the beam.

7. In a clutch, driving and driven members arranged for frictional engagement under pressure, means for furnishing the pressure, levers each having a fulcrum point and a pivot point on clutch members and a power point to which the pressure is applied for packing the clutch members together, means for relieving the pressure for disengagement of the clutch members, one of said points on each lever comprising a simple beam of spring metal supported at spaced locations with the lever mounted therebetween, and which simple beam is arranged and constructed so that it is subject to deflection and to a shortening of the distance between its locations of support upon the application of the packing pressure thereto.

8. In a clutch, a driving member, a driven member, a second driving member in the form of an axially shiftable pressure plate, a plurality of levers, means providing a pivotal connection for each lever on one driving member, the other driving member having spaced flats thereon on opposite sides of each lever, an arched beam for each lever each having its ends engaging the flats and each having a central portion upon which the lever pivots, and means for applying clutch packing pressure through the levers and which subjects the beams to deflection for cushioning clutch engagement.

9. In a clutch, a driving member, a driven member, another driving member in the form of a shiftable pressure plate, said members being arranged to be frictionally engaged under pressure, spaced flats on one driving member, a spring metal beam having end portions engaging the flats and having an arched intermediate portion between the flats, means for supplying packing pressure to the pressure plate for engaging the clutch including an element for placing the load of the packing pressure on the intermediate arched portion of the beam, whereby the beam is deflected for cushioning clutch engagement, the end portions of the beam which engage the flats being arranged and constructed relative to the flats so that upon deflection the points of support of the beam on the flats shift inwardly from the ends of the beam, whereby the beam shortens and its resistance to flexure increases with deflection, and means for releasing the packing pressure for clutch disengagement.

ERNEST E. WEMP.